United States Patent
Nojima et al.

(10) Patent No.: US 7,907,668 B2
(45) Date of Patent: Mar. 15, 2011

(54) METHOD AND APPARATUS FOR CALCULATING MOVING-IMAGE CORRECTION-COEFFICIENT, MOVING-IMAGE CORRECTING APPARATUS, AND COMPUTER PRODUCT

(75) Inventors: Yuri Nojima, Kawasaki (JP); Masayoshi Shimizu, Kawasaki (JP); Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1112 days.

(21) Appl. No.: 10/973,443

(22) Filed: Oct. 27, 2004

(65) Prior Publication Data
US 2005/0213843 A1 Sep. 29, 2005

(30) Foreign Application Priority Data
Mar. 26, 2004 (JP) .................. 2004-092082

(51) Int. Cl.
*H04N 7/12* (2006.01)
*G03F 3/08* (2006.01)
(52) U.S. Cl. .................. 375/240.26; 358/518
(58) Field of Classification Search ............. 375/240.26; 358/518
See application file for complete search history.

(56) References Cited

U.S. PATENT DOCUMENTS

| | | | |
|---|---|---|---|
| 5,223,949 A | 6/1993 | Honjo | |
| 5,661,523 A | 8/1997 | Yamane | |
| 6,693,960 B2 | 2/2004 | Ito et al. | |
| 6,778,221 B1 | 8/2004 | Nishioka et al. | |
| 2002/0085740 A1 | 7/2002 | Asano et al. | |
| 2002/0145678 A1 | 10/2002 | Suzuki et al. | |
| 2003/0184826 A1* | 10/2003 | Takemoto et al. | 358/518 |

FOREIGN PATENT DOCUMENTS

| | | |
|---|---|---|
| EP | 1 006 723 | 6/2000 |
| EP | 1 351 493 A2 | 10/2003 |
| JP | 4-318791 | 11/1992 |
| JP | 4-373283 | 12/1992 |
| JP | 7-135657 | 5/1995 |
| JP | 7-288810 | 10/1995 |
| JP | 2000-165821 | 6/2000 |
| JP | 2000-188756 | 7/2000 |
| JP | 2000-358221 A | 12/2000 |
| JP | 2002-77723 | 3/2002 |
| JP | 2002-152669 | 5/2002 |
| JP | 2002-262303 | 9/2002 |
| JP | 2002-300615 | 10/2002 |
| JP | 2003-264849 A | 9/2003 |

OTHER PUBLICATIONS

European Search Report dated May 20, 2008, issued in corresponding Application No. 04025570.5-1522.
Juha Katajamaki et al.; "Image Dependent Gamma Selection Based on Color Palette Equalization and a Simple Lightness Model"; Proc. Of $7^{th}$ CIC, pp. 301-306 (1999).
Japanese Office Action dated Jan. 20, 2009 (mailing date) issued in corresponding Japanese Patent Application No. 2004-092082.
Office Action dated Aug. 25, 2009 isued in corresponding Japanese Patent Application No. 2004-092082 (partial English language translation).

* cited by examiner

*Primary Examiner* — Y. Lee
*Assistant Examiner* — Richard Torrente
(74) *Attorney, Agent, or Firm* — Westerman, Hattori, Daniels & Adrian, LLP (57) ABSTRACT

A temporary correction-coefficient calculator of a moving-image correction-coefficient calculating apparatus calculates temporary gamma values to be applied to frames extracted from frames of a moving-image at a predetermined time interval, a storage unit stores the calculated temporary gamma values, and a correction-coefficient calculator calculates gamma values to be applied to the frames of the moving-image based on the stored temporary gamma values.

16 Claims, 11 Drawing Sheets

METHOD AND APPARATUS FOR CALCULATING MOVING-IMAGE CORRECTION-COEFFICIENT, MOVING-IMAGE CORRECTING APPARATUS, AND COMPUTER PRODUCT

BACKGROUND OF THE INVENTION

1) Field of the Invention

The present invention relates to a technology for calculating a moving-image correction coefficient that is applied to a frame of a moving-image, and for correcting the moving-image by applying the moving-image correction coefficient calculated.

2) Description of the Related Art

In order to improve image quality of moving-images acquired by video cameras, conventionally, various corrections such as gamma correction, color balance correction, and chroma saturation correction are made. The correction is normally made for each frame of a moving-image, but since a calculation amount becomes voluminous, a method in which a calculation amount can be reduced is proposed.

For example, Japanese Patent Application Laid-Open No. 2002-77723 discloses a moving-image processing apparatus that calculates correction-coefficients only when a scene change such that an image greatly changes is detected, and uses the correction-coefficients until a next scene change is detected so as to reduce a calculation amount.

Japanese Patent Application Laid-Open No. 2002-262303 discloses an image processing apparatus that calculates correction-coefficients when a scene is changed or when the number of the frames in a moving-image is counted, and the counted value exceeds a predetermined threshold.

However, in the conventional techniques described above, since the same correction-coefficients are used until the scene change is detected or the number of frames exceeds a certain value, the improvement of the image quality cannot be really expected.

In the technique disclosed in the Japanese Patent Application Laid-Open No. 2002-262303, a predetermined threshold at the time of comparing the number of frames with a counted value is reduced, so that the correction-coefficients may be calculated with a shorter time interval. However, a calculation amount of the correction-coefficients becomes large.

SUMMARY OF THE INVENTION

It is an object of the present invention to solve at least the above problems in the conventional technology.

An apparatus for calculating a moving-image correction-coefficient to be applied to frames of a moving-image, according to one aspect of the present invention includes a temporary calculating unit that calculates a temporary correction-coefficient to be applied to a frame extracted from the frames of the moving-image based on a first standard; a temporary storage unit that stores the temporary correction-coefficient calculated by the temporary calculating unit; and a correction-coefficient calculating unit that calculates the moving-image correction-coefficient based on the temporary correction-coefficient stored in the temporary storage unit.

An apparatus for correcting a moving-image, according to another aspect of the present invention includes a correction-coefficient receiving unit that receives the moving-image correction-coefficient transmitted by a correction-coefficient transmitting unit of an apparatus for calculating a moving-image correction-coefficient, the apparatus for calculating a moving-image correction-coefficient including a temporary calculating unit (25b) that calculates a temporary correction-coefficient to be applied to a frame extracted from frames of the moving-image based on a first standard, a temporary storage unit (24) that stores the temporary correction-coefficient calculated by the temporary calculating unit (25b), a correction-coefficient calculating unit (25c) that calculates the moving-image correction-coefficient based on the temporary correction-coefficient stored in the temporary storage unit (24), and the correction-coefficient transmitting unit that transmits the moving-image correction-coefficient calculated; and a moving-image correcting unit (50b) that corrects the frames of the moving-image by that applying the moving-image correction-coefficient received to frames of the moving-image.

A method of calculating a moving-image correction-coefficient to be applied to frames of a moving-image, according to still another aspect of the present invention includes calculating a temporary correction-coefficient to be applied to a frame extracted from the frames of the moving-image based on a first standard; storing the temporary correction-coefficient calculated by the temporary calculating unit; and calculating unit the moving-image correction-coefficient based on the temporary correction-coefficient stored.

A computer program according to still another aspect of the present invention realizes the method according to the above aspect on a computer.

The other objects, features, and advantages of the present invention are specifically set forth in or will become apparent from the following detailed description of the invention when read in conjunction with the accompanying drawings.

DETAILED DESCRIPTION

Exemplary embodiments of a method and an apparatus for calculating a moving-image correction-coefficient, a moving-image correcting apparatus, and a computer product according to the present invention will be explained in detail with reference to the accompanying drawings. In the embodiments, correction-coefficients of gamma correction (gamma value) is exemplified, but the present invention is not limited to this, and the similar process can be used for the other correction-coefficients such as correction-coefficients of color balance correction and correction-coefficients of chroma saturation correction.

Figure 1:
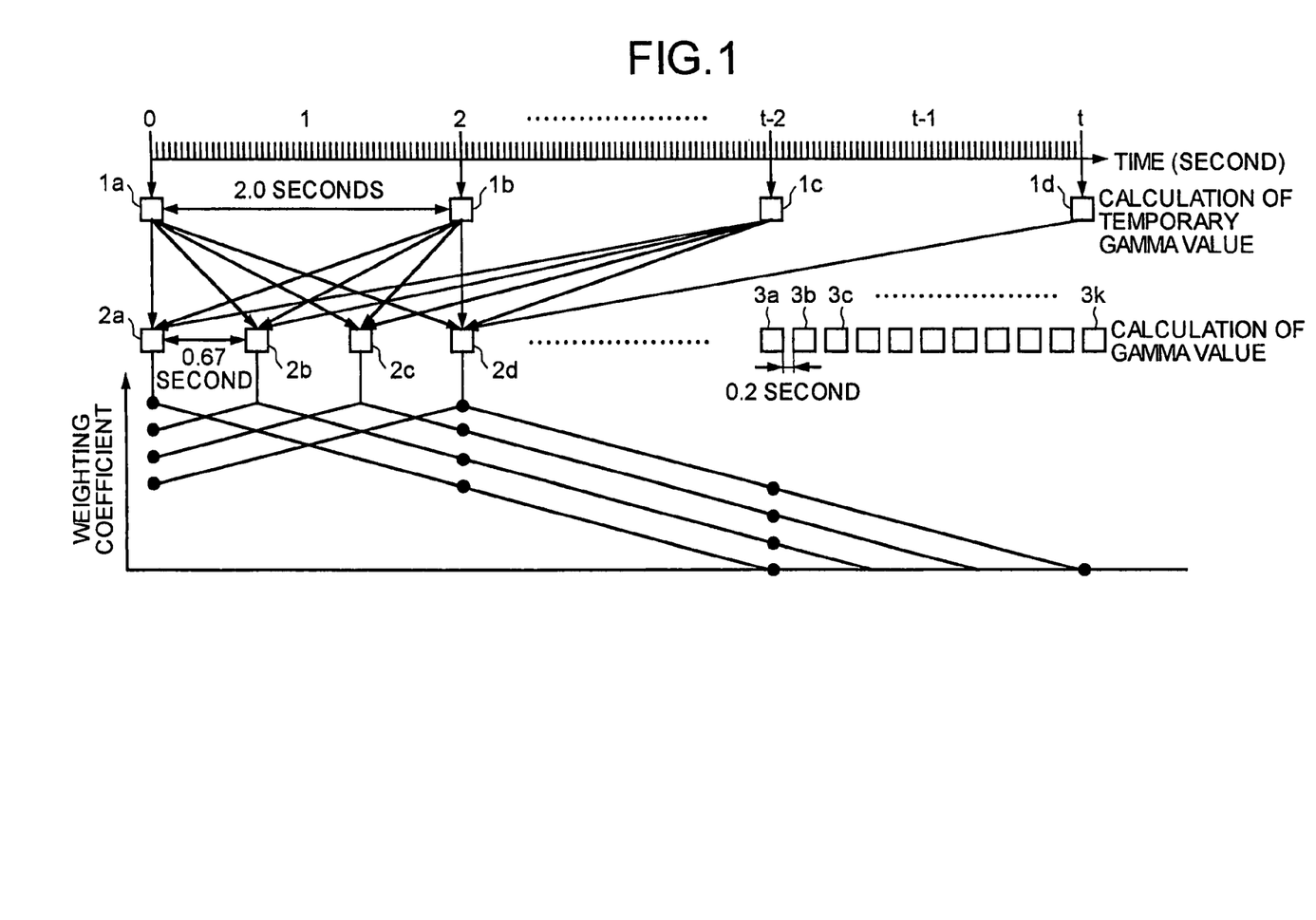
FIG. 1 is an explanatory diagram of the concept of a moving-image correction-coefficient calculating process according to a first embodiment of the present invention.

FIG. 1 is an explanatory diagram of the concept of the moving-image correction-coefficient calculating process according to a first embodiment of the present invention. FIG. 1 is an example of a moving-image in which 25 frames are reproduced every 1 second (one frame at 0.04 second).

According to the first embodiment, in order to calculate temporary gamma values, temporary gamma value calculating frames are extracted at a predetermined interval. In the example of FIG. 1, the temporary gamma value calculating frames 1a to 1d are extracted every 2 seconds. Gamma values for the extracted temporary gamma value calculating frames 1a to 1d are calculated, so that the calculated gamma values are the temporary gamma values.

A publicly-known technique is used for calculating the gamma values. For example, gamma values are calculated by an example disclosed in "Image Dependent Gamma Selection Based on Color Palette Equalization and a Simple Lightness Model" by Juha Ktajamaki (last "a" is an umlaut of an alphabet a) and Pekka Laihanen, Proc. of 7th CIC, 301-306 (1999).

Differences in the temporary gamma values are calculated between adjacent temporary gamma value calculating frames (for example, between the temporary gamma value calculating frames 1a and 1b, between the temporary gamma value calculating frames 1b and 1c, and the like). A frame interval for calculating the gamma values is set according to the differences in the temporary gamma values, and gamma value calculating frames 2a to 2d and 3a to 3k for calculating the gamma values are extracted.

Specifically, when the differences in the temporary gamma values are less than a first threshold (for example, 0.1), it is determined that a change in an image is small, and the interval of the gamma value calculating frames is set to be wide.

In the example of FIG. 1, the differences in the temporary gamma values between the temporary gamma value calculating frames 1a and 1b, and between the temporary gamma value calculating frames 1b and 1c are less than 0.1. Therefore, the intervals between the gamma value calculating frames 2a and 2b, between the gamma value calculating frames 2b and 2c, and between the gamma value calculating frames 2c and 2d are set to 0.67 second.

On the other hand, when the differences in the temporary gamma values are equal to or more than the first threshold, it is determined that the change in the image is large, and the intervals between the gamma value calculating frames are set to be narrow.

In the example of FIG. 1, since the difference in the temporary gamma values between the temporary gamma value calculating frames 1c and 1d is less than 0.1, the intervals between the gamma value calculating frames 3a and 3b, and between the gamma value calculating frames 3b and 3c are set to 0.2 second.

The temporary gamma values are weighted, and an interpolating operation and weighted averaging are performed, so that the gamma values for the gamma value calculating frames are calculated. A gamma value for the frame that is not calculated is set to a value of the gamma value calculating frame just prior to that frame.

Weighting coefficients allocated to the temporary gamma values timewise closer to the gamma value calculating frame where the gamma value is to be calculated are set to be larger.

For example, in the example of FIG. 1, weighting coefficients other than zero are set for the temporary gamma values for the temporary gamma value calculating frames that are 4 seconds before and after reproduced time of the gamma value calculating frame where the gamma value is calculated.

Specifically, the weighting coefficients for the temporary gamma values are determined by a straight line that connects zero and a peak, as shown in FIG. 1, when the weighting coefficient of the temporary gamma value calculating frame corresponding to the reproduced time of the gamma value calculating frame is the peak value, and the weighting coefficient of the temporary gamma value calculating frame at 4th second before and after the reproduced time of the gamma value calculating frame is zero.

The gamma values for the gamma value calculating frames are calculated by performing the interpolating operation using the temporary gamma values weighted by the weighting coefficients. The interpolating operation is performed so that the gamma values are calculated, but the gamma values may be calculated by performing a weighted averaging operation on the temporary gamma values using the weighting coefficients.

The frames are extracted at a predetermined interval so that the temporary gamma values are calculated and not all the gamma values for the frames are calculated. Since the gamma values to be used for the gamma correction are calculated based on the calculated temporary gamma values, image quality can be improved and a calculation amount can be reduced in a balanced manner.

Figure 2:
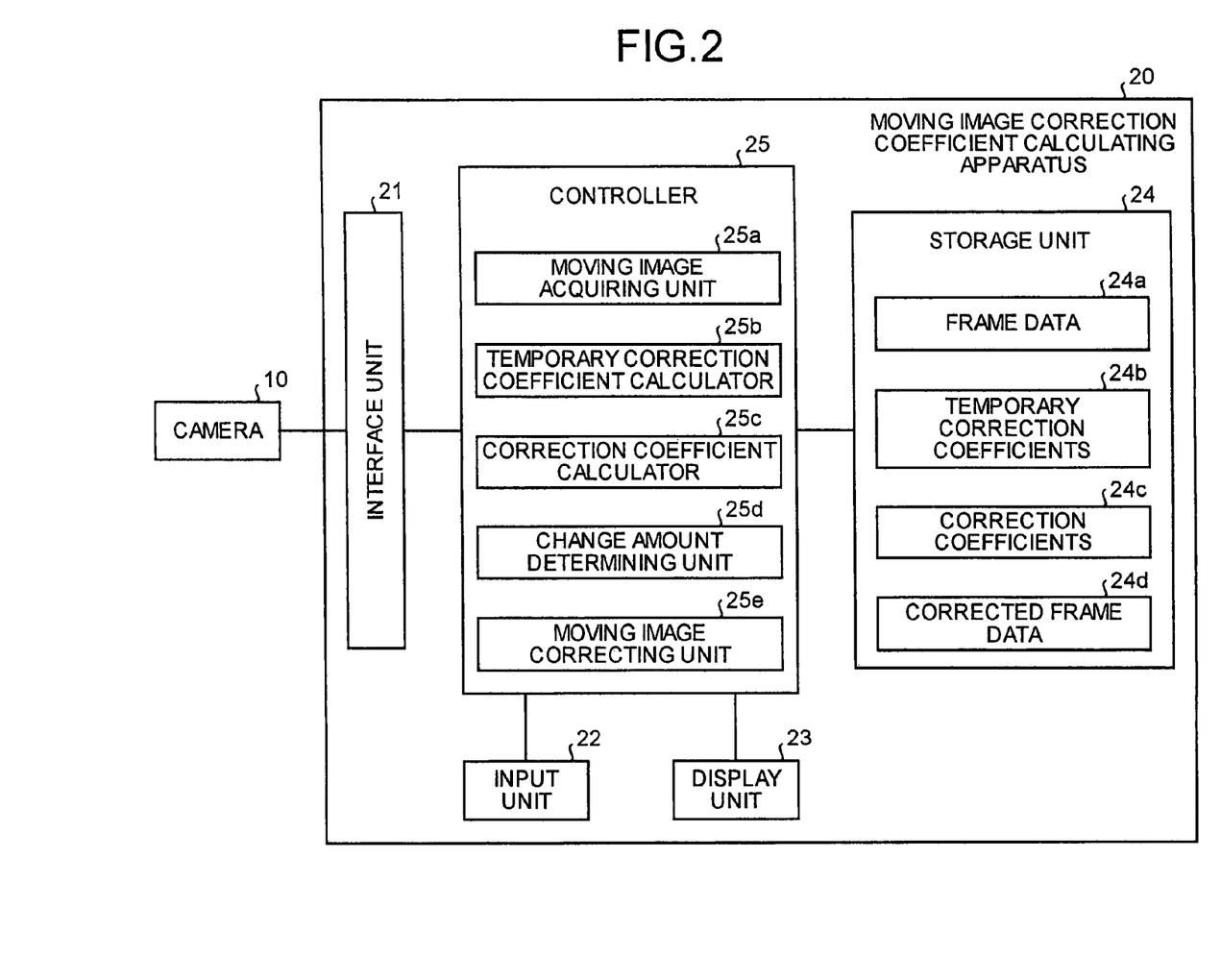
FIG. 2 is a functional block diagram of a configuration of a moving-image correction-coefficient calculating apparatus 20 according to the first embodiment.

A functional configuration of the moving-image correction-coefficient calculating apparatus according to the first embodiment is explained below. FIG. 2 is a functional block diagram of the configuration of a moving-image correction-coefficient calculating apparatus 20 according to the first embodiment. The moving-image correction-coefficient calculating apparatus 20 acquires a moving-image from a camera 10, and executes the gamma correcting process on the acquired moving-image.

As shown in FIG. 2, the moving-image correction-coefficient calculating apparatus 20 has an interface unit 21, an input unit 22, a display unit 23, a storage unit 24, and a controller 25.

The interface unit 21 acquires frame data of a moving-image from the camera 10. A keyboard and a mouse are examples of the input unit 22, and a display is an example of the display unit 23.

The storage unit 24 such as a hard disc device stores frame data 24a, temporary correction-coefficients 24b, correction-coefficients 24c, and correction frame data 24d. The frame data 24a are of a moving-image acquired from the camera 10.

The temporary correction-coefficients 24b are temporary gamma values calculated for temporary gamma value calculating frames, and the correction-coefficients 24c are gamma values for the gamma value calculating frames calculated based on the temporary gamma values. The correction frame data 24d are frame data corrected by using the gamma values.

The controller 25 controls the entire moving-image correction-coefficient calculating apparatus 20, and has a moving-image acquiring unit 25a, a temporary correction-coefficient calculator 25b, a correction-coefficient calculator 25c, a change amount determining unit 25d, and a moving-image correcting unit 25e.

The moving-image acquiring unit 25a acquires frame data of a moving-image from the camera 10, and stores them as the frame data 24a in the storage unit 24.

The temporary correction-coefficient calculator 25b extracts temporary correction-coefficient calculating frames from the frame data 24a at a set time interval, calculates temporary gamma values for the extracted temporary correction-coefficient calculating frames, and stores the calculated temporary gamma values as the temporary correction-coefficients 24b in the storage unit 24.

The correction-coefficient calculator 25c extracts correction-coefficient calculating frames from the frame data 24a at a set time interval, calculates the gamma values for the correction-coefficient calculating frames based on the temporary gamma values calculated by the temporary correction-coefficient calculator 25b, and stores the calculated gamma values as the correction-coefficients 24c in the storage unit 24.

Specifically, the correction-coefficient calculator 25c compares the temporary gamma values between the adjacent temporary correction-coefficient calculating frames. When an absolute value of differences in the temporary gamma values is equal to or more than the first threshold, it is determined that a change in the image is large, and the intervals of the correction-coefficient calculating frames for calculating the gamma values are set to be narrow.

When the absolute value of the differences in the temporary gamma values is less than the first threshold, the correction-coefficient calculator 25c determines that the change in the image is small, and the intervals of the correction-coefficient calculating frames are set to be wide. The correction-coefficient calculator 25c performs the interpolating operation or the weighted averaging operation using the weighted temporary gamma values, so as to calculate the gamma values for the correction-coefficient calculating frames.

The change amount determining unit 25d checks whether the differences in the temporary gamma values between the adjacent temporary correction-coefficient calculating frames are equal to or more than a predetermined threshold. When the differences are equal to or more than the predetermined threshold, it is determined that a scene change that causes large change in the image occurs. The predetermined threshold is set to be larger than the first threshold. When determined that the scene change occurs, the change amount determining unit 25d requests the temporary correction-coefficient calculator 25b and the correction-coefficient calculator 25c to execute the correction-coefficient calculating process for the scene change.

Figure 3:
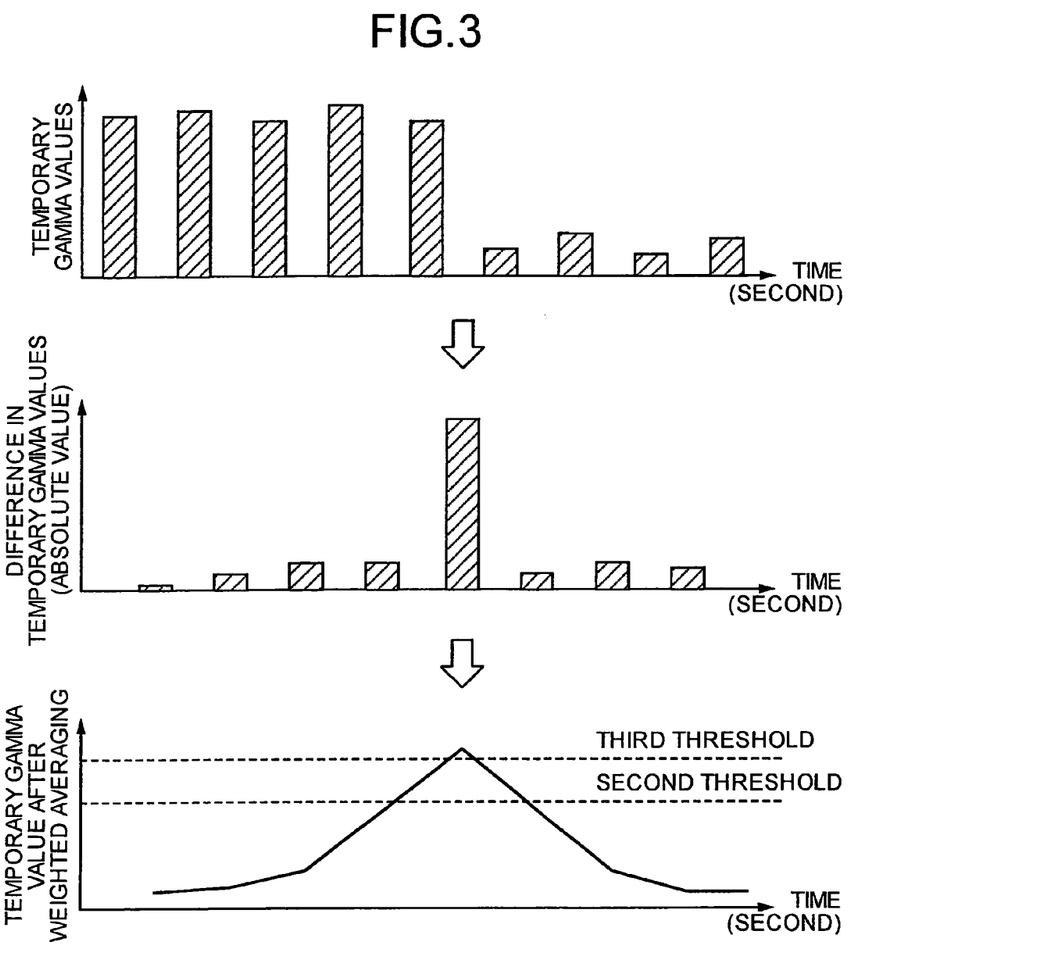
FIG. 3 is an explanatory diagram of a scene change detecting process to be executed by a change amount determining unit 25d.

FIG. 3 is an explanatory diagram of a scene change detecting process to be executed by the change amount determining unit 25d. As shown in FIG. 3, the change amount determining unit 25d calculates the differences (absolute value) in the temporary gamma values between the adjacent temporary correction-coefficient calculating frames, and sets the weighting coefficient to the differences so as to perform the weighted averaging operation. The change amount determining unit 25d calculates a weighted average value of the temporary gamma values.

As to the weighting coefficients, 0.2, 0.6, and 0.2 are allocated to the temporary gamma value just prior to the target temporary gamma value, the target temporary gamma value, and the temporary gamma value just after the target temporary gamma value, respectively.

The change amount determining unit 25d checks whether the weighted average value of the differences in the temporary gamma values is larger than a second threshold, or larger than a third threshold (here, the third threshold is set to be larger than the second threshold). When the weighted average value of the differences is less than the second threshold, the change amount determining unit 25d determines that the scene change does not occur.

When the weighted average value of the differences is equal to or more than the second threshold, the change amount determining unit 25d extracts the correction-coefficient calculating frames at a narrower interval, and requests the correction-coefficient calculator 25c to calculate the gamma values at a narrower interval.

The change amount determining unit 25d extracts the temporary correction-coefficient calculating frames at a narrower interval, and requests the temporary correction-coefficient calculator 25b to calculate the temporary gamma values at a narrower interval. The change amount determining unit 25d may request the correction-coefficient calculator 25c to calculate the gamma values for the correction-coefficient calculating frames based on the calculated temporary gamma values.

Further, when the weighted average value of the differences in the temporary gamma values is equal to or more than the second threshold, the change amount determining unit 25d changes the weighting coefficient allocating method applied to the temporary gamma values at the time of performing the interpolating operation or the weighted averaging operation.

Specifically, in FIG. 1, the weighting coefficient of the temporary gamma value calculating frame at 4th second before and after the reproduced time of the gamma value calculating frame is zero. When the scene change is detected, however, the correction-coefficient calculator 25c sets the weighting coefficient of the temporary gamma value around 2nd second from the reproduced time of the gamma value calculating frame, for example, to zero, and increases the weighting coefficient of the peak value accordingly. The correction-coefficient calculator 25c determines the weighting coefficients according to the straight line that connects zero and the peak value, so as to emphasize the temporary gamma values of the temporary gamma value calculating frames timewise closer to the gamma value calculating frames.

When the weighted average value of the differences in the temporary gamma values is equal to or more than the third threshold, the correction-coefficient calculator 25c determines the weighting coefficients according to a straight line that connects zero and a peak value when the weighting coefficients of the temporary gamma value around 1st second from the reproduced time of the gamma value calculating frame is zero and the weighting coefficient of the peak value is increased. As a result, the temporary gamma values for the temporary gamma value calculating frames timewise closer to the gamma value calculating frames are further emphasized.

Figure 4:
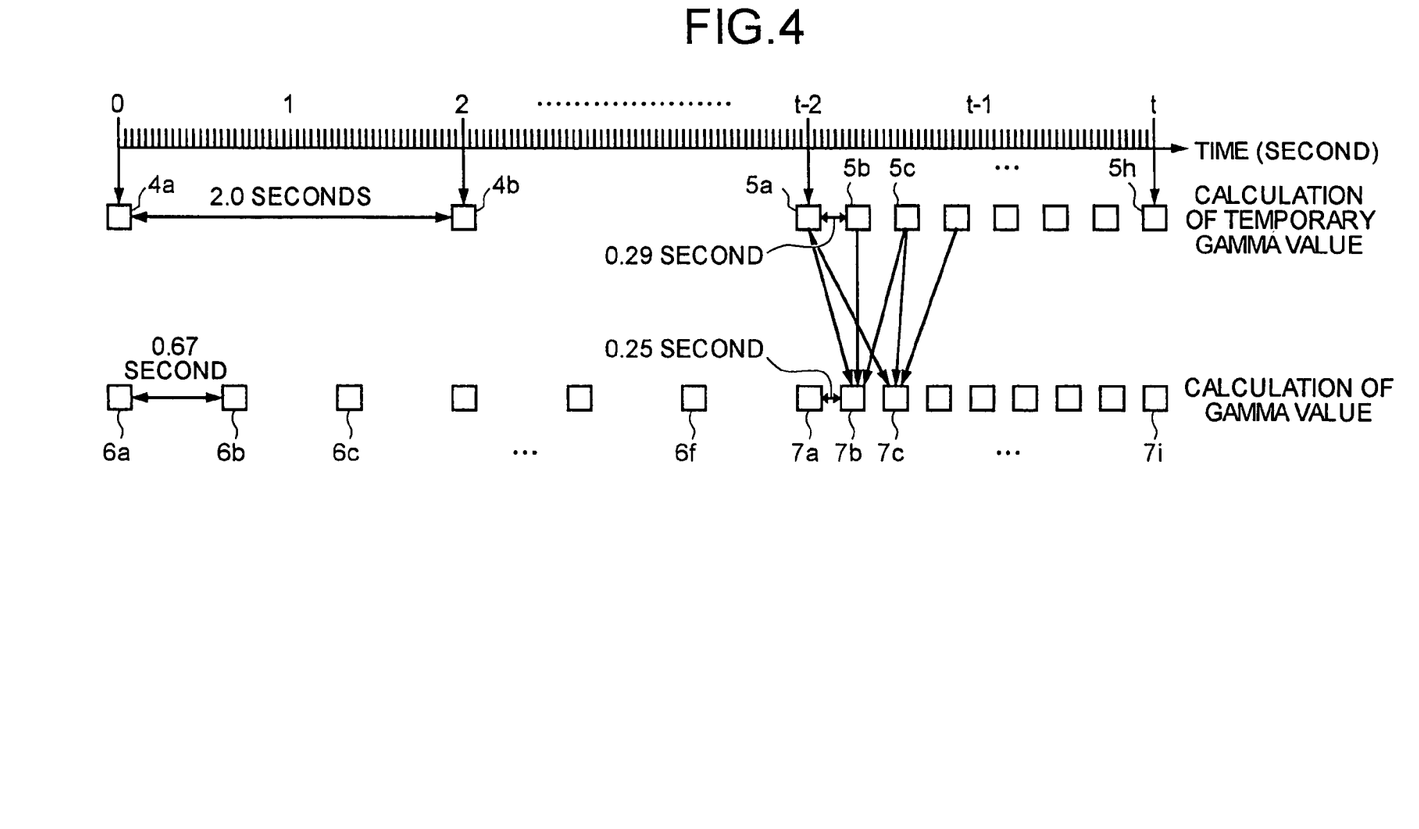
FIG. 4 is an explanatory diagram of a correction-coefficient calculating process when a scene change is detected.

FIG. 4 is an explanatory diagram of the correction-coefficient calculating process when the scene change is detected. As shown in FIG. 4, when the change amount determining unit 25d detects the scene change, the correction-coefficient calculator 25c extracts gamma value calculating frames 7a to 7i at a narrower interval than that for no scene change. The correction-coefficient calculator 25c calculates gamma values for the respective gamma value calculating frames 7a to 7i.

In the example of FIG. 4, when the scene change does not occur, the gamma value calculating frames 6a to 6f are extracted at an interval of 0.67 second, but when the scene change occurs, the gamma value calculating frames 7a to 7i are extracted at an interval of 0.25 second.

When the change amount determining unit 25d detects the scene change, the temporary correction-coefficient calculator 25b extracts temporary gamma value calculating frames 5a to 5h at a narrower interval, and calculates temporary gamma values at a narrower interval.

In the example of FIG. 4, when the scene change does not occur, temporary gamma value calculating frames 4a and 4b are extracted at an interval of 2.0 seconds, but when the scene change occurs, the temporary gamma value calculating frames 5a to 5h are extracted at an interval of 0.29 second.

Figure 5:
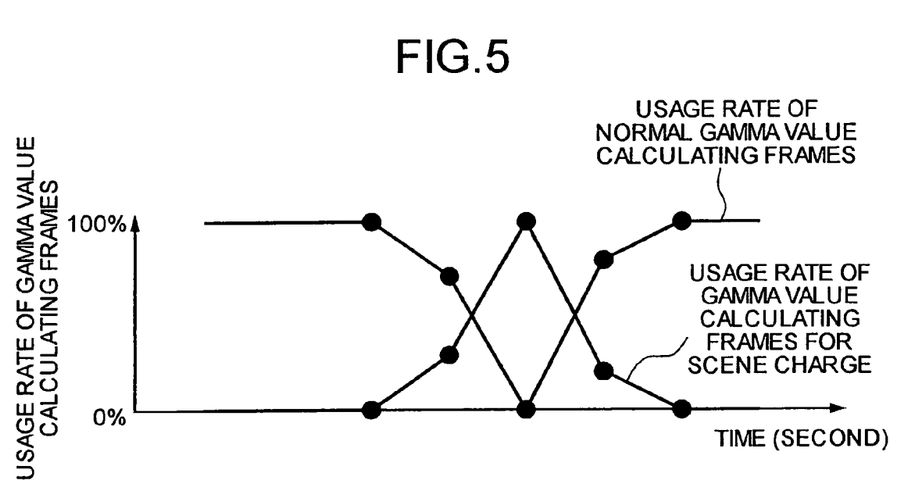
FIG. 5 depicts a situation of a usage rate of gamma value calculating frames for scene change when the scene change is detected.

FIG. 5 depicts a situation of a usage rate of the gamma value calculating frames for the scene change at the time when the scene change is detected. As shown in FIG. 5, when the scene change is detected, the ratio of the gamma value calculating frames extracted at a narrower time interval gradually increases than that for no scene change.

As explained with reference to FIG. 1, this is because the gamma values for the gamma value calculating frames are calculated based on a result obtained by performing the interpolating operation or the weighted averaging on a plurality of temporary gamma values. Therefore, rapid change in the quality of a moving-image can be suppressed, and the change in the image quality can be natural.

With reference to FIG. 2, the moving-image correcting unit 25e uses the gamma values calculated by the correction-coefficient calculator 25c and stored as the correction-coefficients 24c in the storage unit 24 so as to perform the gamma correction for the frame data 24a. The moving-image correcting unit 25e stores the gamma-corrected frame data as the correction frame data 24d.

Figure 6:
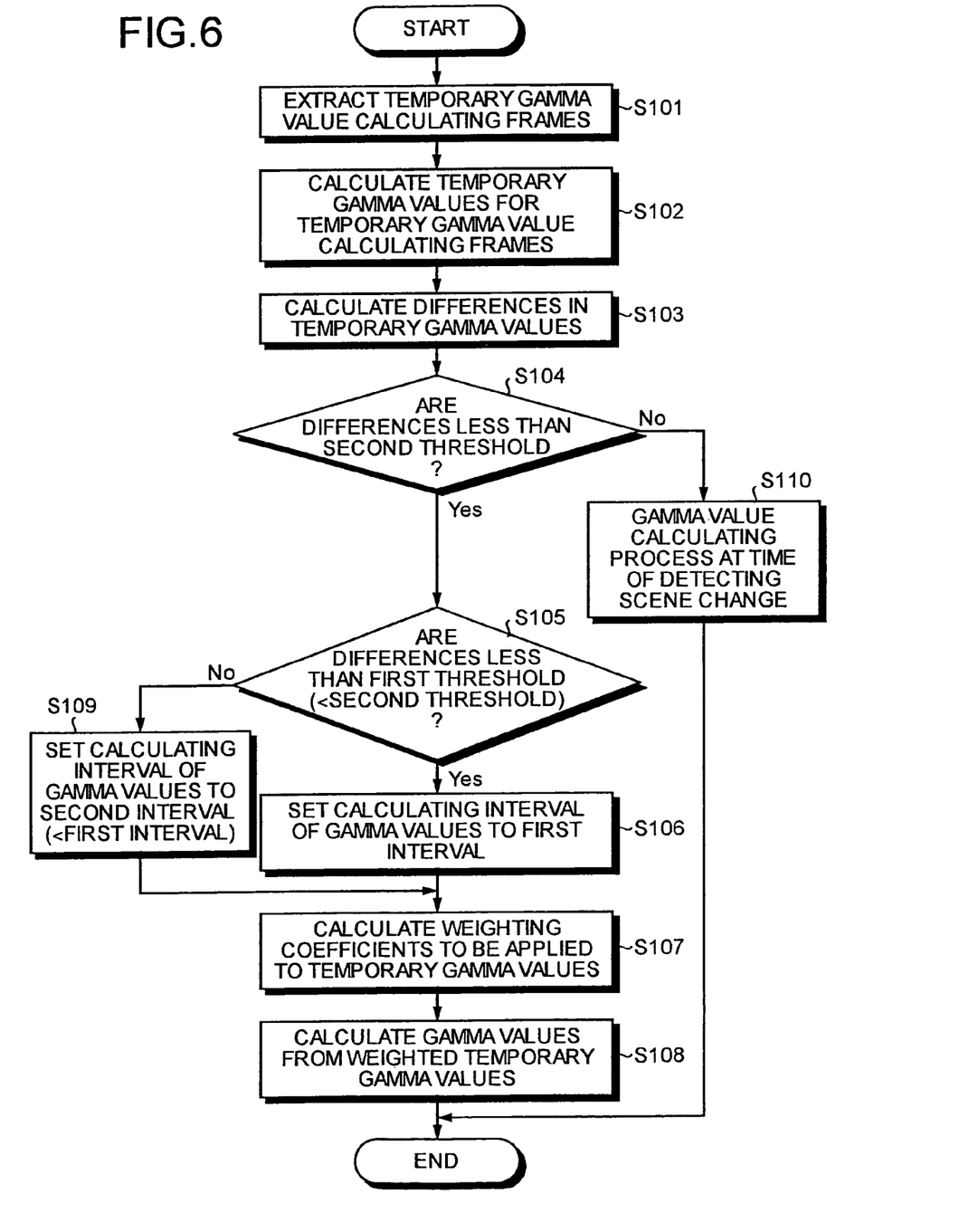
FIG. 6 is a flowchart of a procedure of the moving-image correction-coefficient calculating process according to the first embodiment.

The procedure of the moving-image correction-coefficient calculating process according to the first embodiment is explained below. FIG. 6 is a flowchart of the procedure of the moving-image correction-coefficient calculating process according to the first embodiment.

As shown in FIG. 6, the temporary correction-coefficient calculator 25b of the moving-image correction-coefficient calculating apparatus 20 extracts temporary gamma value calculating frames for calculating temporary gamma values from the frame data 24a stored in the storage unit 24 at a predetermined time interval (step S101).

The temporary correction-coefficient calculator 25b calculates the temporary gamma values for the extracted temporary gamma value calculating frames (step S102), and calculates differences in the temporary gamma values between the adjacent temporary gamma value calculating frames (step S103).

Therefore, the change amount determining unit 25d checks whether the differences in the temporary gamma values are less than the second threshold explained with reference to FIG. 3 (step S104). When the differences are not less than the second threshold (No at step S104), the change amount determining unit 25d determines that a scene change where a change in an image is large occurs, and executes the gamma value calculating process at the time when the scene change is detected (step S110). The gamma value calculating process at the time when the scene change is detected is explained in detail with reference to FIG. 7.

When the differences in the temporary gamma values are less than the second threshold at step S104 (Yes at step S104), the correction-coefficient calculator 25c checks whether the differences in the temporary gamma values are less than the first threshold explained with reference to FIG. 1 (step S105). The first threshold is set to a smaller value than the second threshold.

When the differences in the temporary gamma values are less than the first threshold (Yes at step S105), the correction-coefficient calculator 25c sets a calculating interval for calculating the gamma values to a first interval (step S106).

When the differences in the temporary gamma values are not less than the first threshold (No at step S105), the correction-coefficient calculator 25c sets the calculating interval for calculating the gamma values to a second interval (step S109), in which case, since it is determined that the change in the moving-image is large, the second interval is set to be shorter than the first interval.

After step S106 or step S109, the correction-coefficient calculator 25c calculates weighting coefficients applied to the temporary gamma values according to the method explained with reference to FIG. 1 (step S107). The correction-coefficient calculator 25c uses the weighted temporary gamma values to which the weighting coefficients are applied, so as to perform the interpolating operation or the weighted averaging operation. The correction-coefficient calculator 25c calculates the gamma values at the time interval set at step S106 or step S109 (step S108), and ends this moving-image correction-coefficient calculating process.

Figure 7:
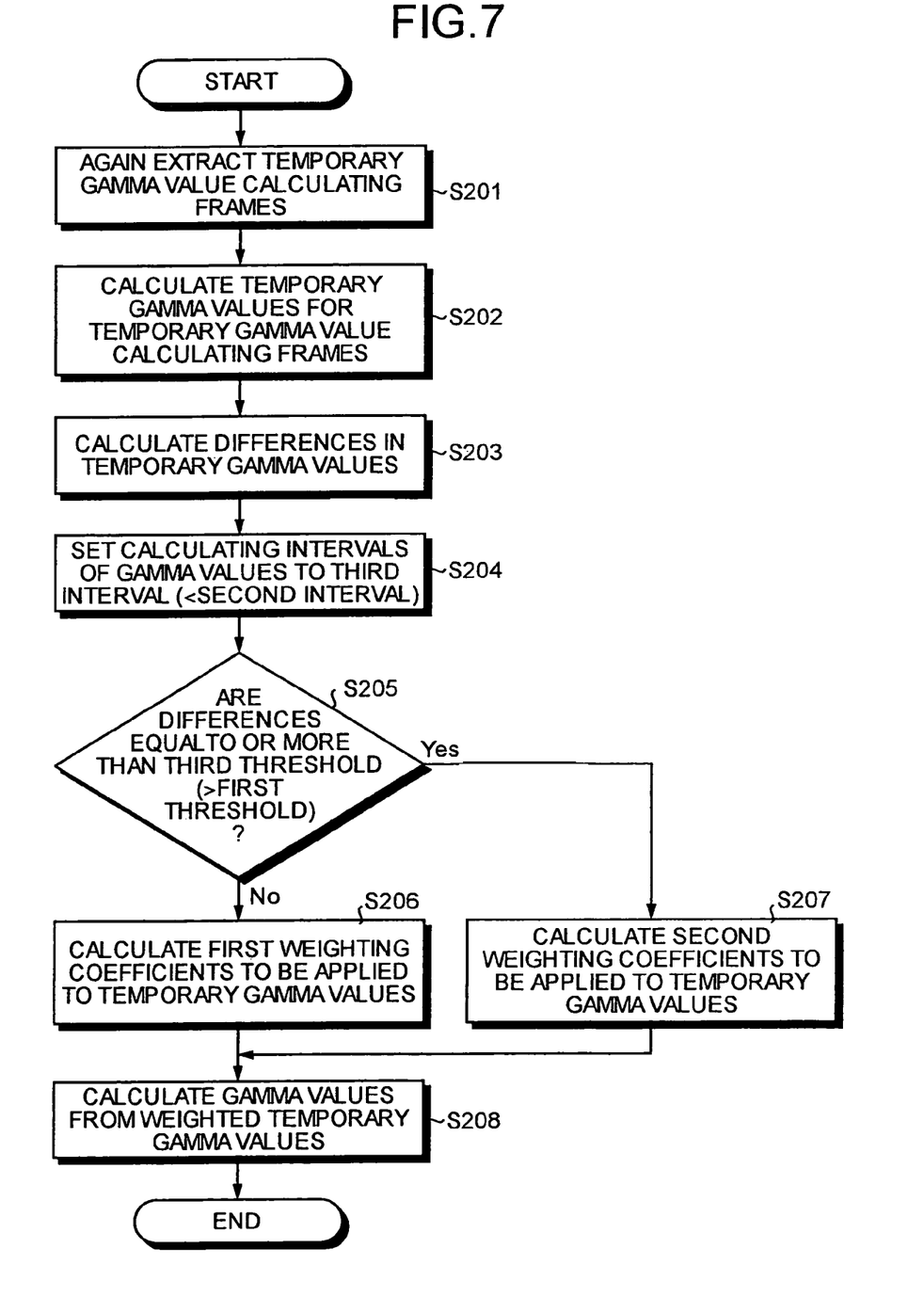
FIG. 7 is a flowchart of a process of a gamma value calculating process when the scene change is detected as shown in FIG. 6.

The procedure of the gamma value calculating process at the time when the scene change is detected shown in FIG. 6 is explained blow. FIG. 7 is a flowchart of such the procedure at the time when the scene change is detected shown in FIG. 6.

As shown in FIG. 7, the temporary correction-coefficient calculator 25b of the moving-image correction-coefficient calculating apparatus 20 again extracts the temporary gamma value calculating frames at a shorter interval than the interval of the extraction at step S101 in FIG. 6 (step S201).

The temporary correction-coefficient calculator 25b calculates the temporary gamma values for the extracted temporary gamma value calculating frames (step S202), and further calculates differences in the temporary gamma values (step S203). The differences in the temporary gamma values are calculated according to the method explained with reference to FIG. 3.

The correction-coefficient calculator 25c sets the gamma value calculating interval to the third interval (step S204). The third interval is set to be shorter than the second interval explained with reference to FIG. 6.

The correction-coefficient calculator 25c checks whether the differences in the temporary gamma values calculated at step S203 are equal to or more than the third threshold (step S205). When the differences in the temporary gamma values are not equal to or more than the third threshold (No at step S205), the correction-coefficient calculator 25c calculates first weighting coefficients to be applied to the temporary gamma values (step S206).

Specifically, in FIG. 1, the weighting coefficient of the temporary gamma value calculating frame around the 4th second from the reproduced time of the gamma value calculating frame is zero. When, however, the differences in the temporary gamma values are not equal to or more than the third threshold, the correction-coefficient calculator 25c sets the weighting coefficient of the temporary gamma value around the 2nd second from the reproduced time of the gamma value calculating frame, for example to zero, and increases the weighting coefficient of the peak value accordingly. The correction-coefficient calculator 25c determines the weighting coefficients according to the straight line that connects zero and the peak value, so as to emphasize the temporary gamma values for the temporary gamma value calculating frames timewise closer to the gamma value calculating frames.

When the differences in the temporary gamma values are equal to or more than the third threshold at step S205 (Yes at step S205), the correction-coefficient calculator 25c calculates second weighting coefficients to be applied to the temporary gamma values (step S207).

Specifically, when the differences in the temporary gamma values are equal to or more than the third threshold, the correction-coefficient calculator 25c sets the weighting coefficient of the temporary gamma value around the 1st second from the reproduced time of the gamma value calculating frame, for example to zero. The correction-coefficient calculator 25c increases the weighting coefficient of the peak value, and determines the weighting coefficients according to the straight line that connects zero and the peak value, so as to emphasize the temporary gamma values for the temporary gamma value calculating frames timewise closer to the gamma value calculating frames.

After step S206 or step S207, the correction-coefficient calculator 25c uses the weighted temporary gamma values to which the weighting coefficients are applied so as to perform the interpolating operation or the weighted averaging operation. The correction-coefficient calculator 25c calculates the gamma values at the time interval set at step S204 (step S208), and ends the gamma value calculating process at the time when the scene change is detected.

The time interval for calculating the temporary gamma values, the time interval for calculating the gamma values, the weighting coefficients, the threshold, and the like are previously set, and some of them are updated by the moving-image correction-coefficient calculating apparatus 20 during the gamma value calculating process. However, the temporary correction-coefficient calculator 25b, the correction-coefficient calculator 25c, or the change amount determining unit 25d may accept inputs for setting these values from a user during the gamma value calculating process, and the accepted settings may be reflected on the gamma value calculating process.

As explained above, according to the first embodiment, the temporary correction-coefficient calculator 25b calculates the temporary gamma values to be applied to the extracted frames from the moving-image frames at the predetermined time interval. The storage unit 24 stores the calculated temporary-gamma values, and the correction-coefficient calculator 25c calculates the gamma values to be applied to the frames of the moving-image based on the stored temporary gamma values. Therefore, image quality can be improved and a calculation amount can be reduced in a balanced manner.

According to the first embodiment, the correction-coefficient calculator 25c calculates the gamma values to be applied to the frames of the moving-image extracted at the predetermined time interval. Therefore, a calculation amount for calculating the gamma values can be further reduced.

According to the first embodiment, the correction-coefficient calculator 25c changes the time interval for calculating the gamma values based on the change amount of the calculated temporary gamma values. Therefore, the gamma values can be calculated according to a fluctuation in the temporary gamma values at a suitable interval.

According to the first embodiment, the correction-coefficient calculator 25c performs the weighted averaging on the calculated temporary gamma values, so as to calculate the gamma values to be applied to the frames of the moving-image. Therefore, a calculation amount for the gamma values can be reduced and the image quality can be improved in a balanced manner.

According to the first embodiment, when the correction-coefficient calculator 25c performs the weighted averaging, larger weighting coefficients are applied to the temporary gamma values for the frames with smaller time difference from the frames to which the gamma values are applied. Therefore, the temporary gamma values for the frames timewise closer to the frames to which the gamma values are applied are emphasized, so that the image quality can be improved.

According to the first embodiment, the correction-coefficient calculator 25c performs the interpolating operation on the calculated temporary gamma values, so as to calculate the gamma values to be applied to the frames of the moving-image. Therefore, a calculation amount for calculating the gamma values can be reduced and the image quality can be improved in a balanced manner.

According to the first embodiment, when the correction-coefficient calculator 25c performs the interpolating operation, larger weighting coefficients are applied to the temporary gamma values for the frames with smaller time difference from the frames to which the gamma values are applied. Therefore, the temporary gamma values for the frames timewise closer to the frames to which the gamma values are applied are emphasized, so that the image quality can be improved.

According to the first embodiment, the change amount determining unit 25d determines an image change amount of the frames, and when the image change amount is determined as large, the correction-coefficient calculator 25c changes timing at which the gamma values are calculated. Therefore, the timing at which the gamma values are calculated is changed, so that the image quality can be improved.

According to the first embodiment, the change amount determining unit 25d determines the image change amount of the frames based on a change in the temporary gamma values. Therefore the image change amount of the frames can be determined efficiently.

According to the first embodiment, when it is determined that the image change amount is large, the temporary correction-coefficient calculator 25d changes the timing at which the temporary gamma values are calculated. Therefore, when the scene change whose image change amount is large occurs, the gamma values are calculated more suitably, so that the image quality can be improved.

According to the first embodiment, when it is determined that the image change amount is large, the correction-coefficient calculator 25c sets the weighting coefficients that are applied to the temporary gamma values at the time of calculating the gamma values based on the image change amount. Therefore, the gamma values are calculated more suitably, so that the image quality can be improved.

According to the first embodiment, the temporary correction-coefficient calculator 25b, the correction-coefficient calculator 25c, or the change amount determining unit 25d accepts inputs of the setting relating to the calculation of the temporary gamma values or the setting relating to the calculation of the gamma values. Since the temporary gamma values or the gamma values are calculated based on the accepted settings, the setting specified by the user can be reflected on the calculation of the temporary gamma values or the gamma values.

According to the first embodiment, the moving-image correction-coefficient calculating apparatus performs the gamma correction on the frames of a moving-image using the gamma values calculated by the apparatus. A client (moving-image correcting apparatus) may, however, select and acquire information about the gamma values suitable for the client from a server (moving-image correction-coefficient calculating apparatus) that calculates and provides the gamma values, so as to perform the gamma correction.

Figure 8:
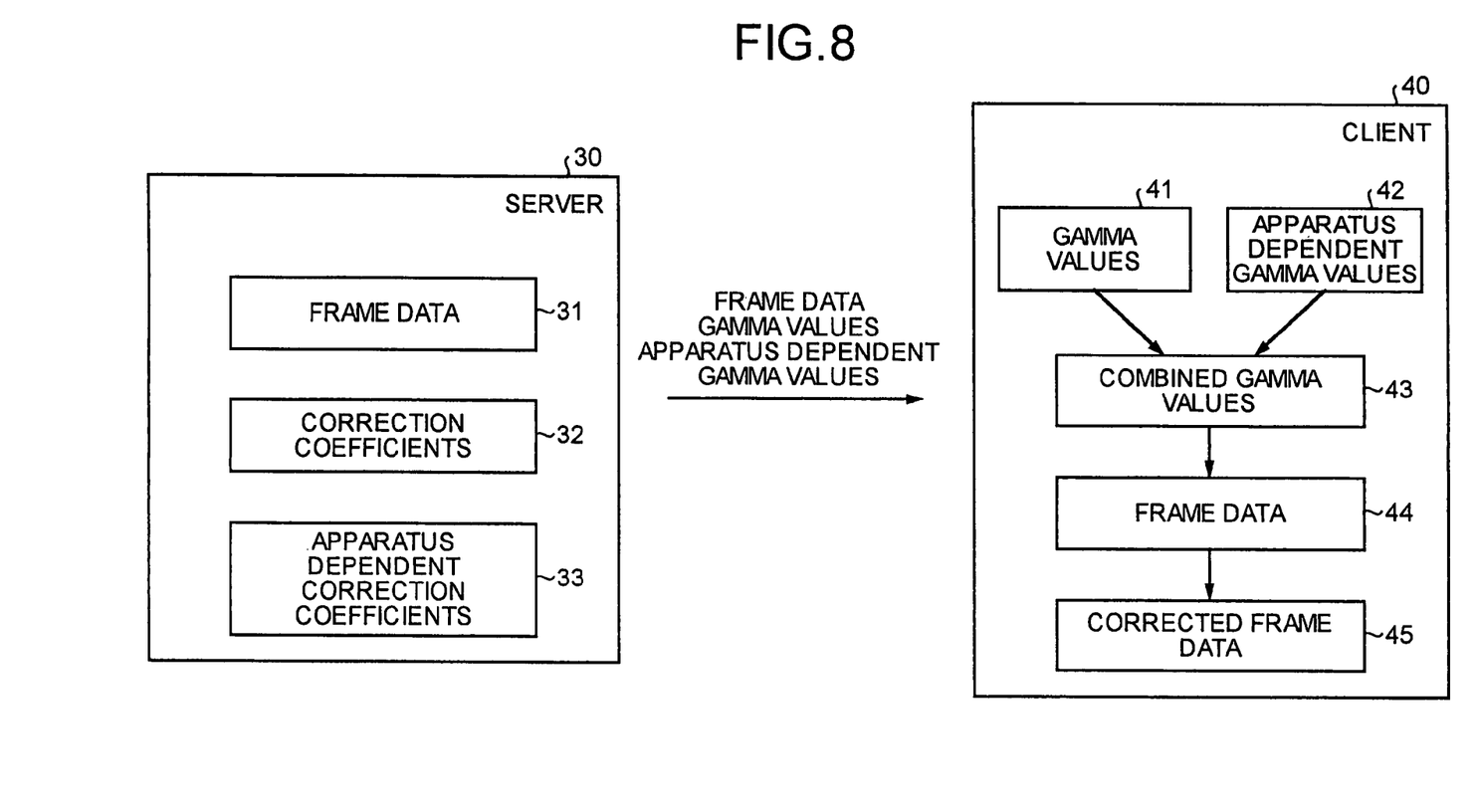
FIG. 8 is an explanatory diagram of the concept of a moving-image correcting process in a moving-image correcting system according to a second embodiment of the present invention.

FIG. 8 is an explanatory diagram of the concept of the moving-image correcting process in the moving-image correcting system according to a second embodiment of the present invention.

As shown in FIG. 8, the moving-image correcting system is constituted so that a server 30 calculates gamma values, a client 40 acquires the gamma values calculated by the server 30, and the gamma correction is performed on the frames of the moving-image.

The server 30 stores frame data 31 that are targets for calculating the gamma values, correction-coefficients 32 that are gamma values calculated for the frame data 31, and apparatus dependent correction-coefficients 33 that are the gamma values calculated adaptably to display characteristics of the moving-image in the client 40.

The client 40 acquires frame data 44 of the moving-image to be reproduced from the frame data 31 stored in the server, and acquires gamma values 41 for the frame data 44 from the correction-coefficients 32. Further, the client 40 acquires apparatus dependent gamma values 42 calculated adaptably to the display characteristics of the moving-image in the client 40 from the apparatus dependent correction-coefficients 33.

The client 40 synthesizes the gamma values 41 with the apparatus dependent gamma values 42 acquired from the server 30, so as to calculate combined gamma values 43 to be used for the gamma correction. The client 40 performs the gamma correction for the frame data 44 using the combined gamma values 44, so as to acquire corrected frame data 45 on which the gamma correction is performed.

Figure 9:
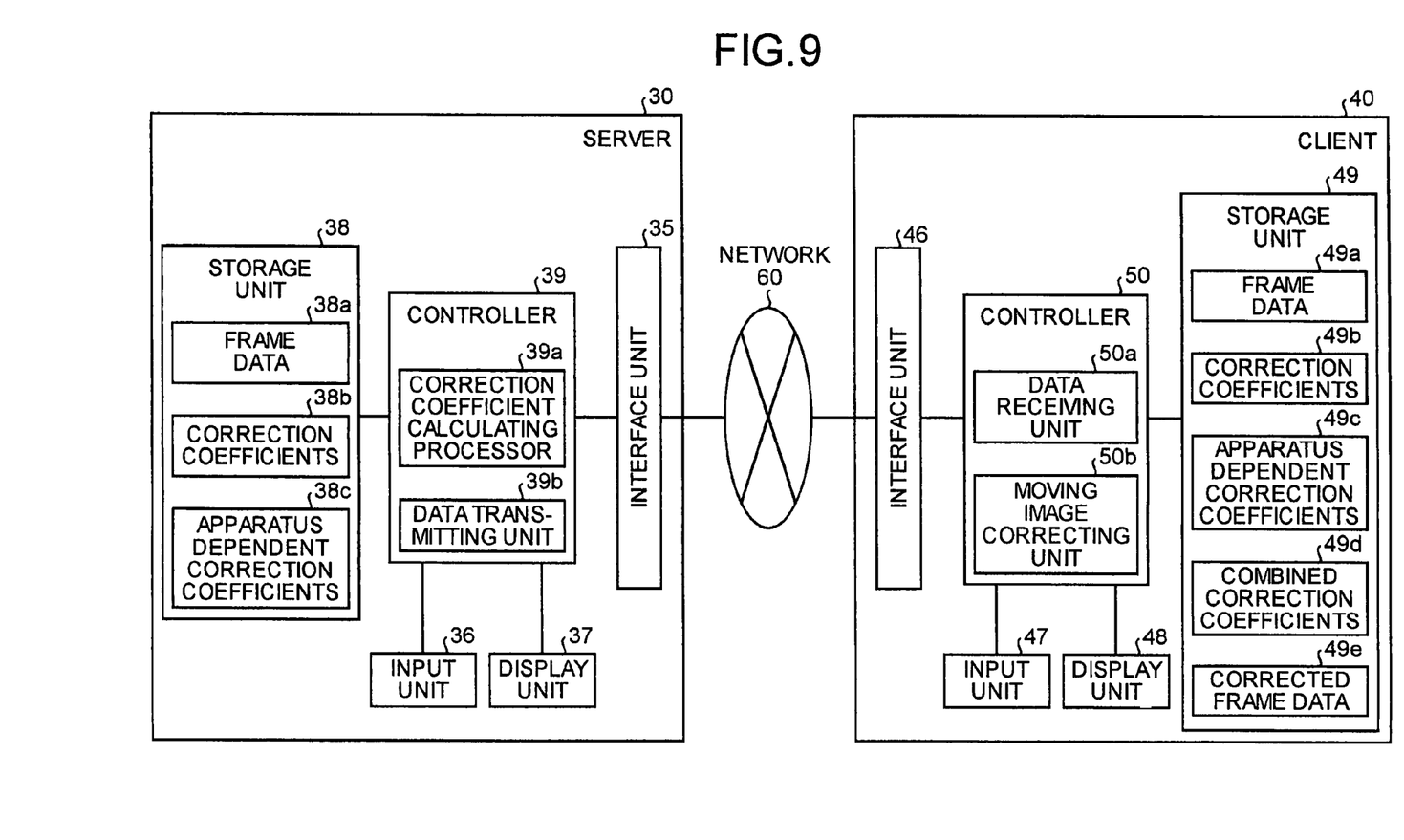
FIG. 9 is a functional block diagram of a configuration of the moving-image correcting system according to the second embodiment.

A functional configuration of the moving-image correcting system according to the second embodiment is explained below. FIG. 9 is a functional block diagram of the configuration of the moving-image correcting system according to the second embodiment. As shown in FIG. 9, the moving-image correcting system is constituted so that the server 30 is connected to the client 40 via a network 60 such as the Internet.

The server 30 calculates gamma values, and has an interface unit 35, an input unit 36, a display unit 37, a storage unit 35, and a controller 39.

The interface unit 35 is a network interface that transmits/receives data to/from the client 40. A keyboard and a mouse are example of the input unit 36. A display is an example of the display unit 37.

The storage unit 38 such as a hard disc device stores frame data 38a, correction-coefficients 38b, and apparatus dependent correction-coefficients 38c therein.

The frame data 38a are of a moving-image. The correction-coefficients 38b are gamma values calculated as explained in the first embodiment. The apparatus dependent correction-coefficients 38c are apparatus dependent gamma values calculated according to the display characteristics of a moving-image in each client.

The controller 39 entirely controls the server 30, and has a correction-coefficient calculating processor 39a and a data transmitter 39b.

The correction-coefficient calculating processor 39a calculates gamma values of the frame data 38a, and has the same functions as those of the moving-image acquiring unit 25a, the temporary correction-coefficient calculator 25b, the correction-coefficient calculator 25c, and the change amount determining unit 25d in the moving-image correction-coefficient calculating apparatus 20 shown in FIG. 2.

The data transmitter 39b acquires the frame data 44, gamma values 41, and the apparatus dependent gamma values 42, whose transmission requests are received from the client 40, from the frame data 38a, the correction-coefficients 38b, and the apparatus dependent correction-coefficients 38c, and transmits them to the client 40.

The client 40 acquires the gamma values calculated by the server 30, and performs the gamma correction on the frames of a moving-image. The client 40 has an interface unit 46, an input unit 47, a display unit 48, a storage unit 49, and a controller 50.

The interface unit 46 is a network interface that transmits/receives data to/from the server 30. A keyboard and a mouse are examples of the input unit 47. A display is an example of the display unit 48.

The storage unit 49 such as a hard disc device stores frame data 49a, correction-coefficients 49b, apparatus dependent correction-coefficients 49c, combined correction-coefficients 49d, and corrected frame data 49e therein.

The frame data 49a, the correction-coefficients 49b, and the apparatus dependent correction-coefficients 49c are data of the frame data 44, the gamma values 41, and the apparatus dependent gamma values 42 acquired from the server 30.

The combined correction-coefficients 49d are, as explained with reference to FIG. 8, the combined gamma values 43 obtained by combining the gamma values 41 with the apparatus dependent gamma values 42. The correction frame data 49e are frame data on which the gamma correction is performed.

The controller 50 controls the entire client 40, and has a data receiver 50a and a moving-image correcting unit 50b.

The data receiver 50a requests the server 30 to transmit the frame data 44, the gamma values 41, or the apparatus dependent, gamma values 42. When these data are transmitted from the server 30, the data receiver 50a receives the data.

The moving-image correcting unit 50b uses the gamma values that are stored as the correction-coefficients 49b, the apparatus dependent correction-coefficients 49c, or the combined correction-coefficients 49d in the storage unit 49 so as to perform the gamma correction on the frame data 49a. The moving-image correcting unit 50b stores the gamma-corrected frame data as the corrected frame data 49e.

As explained above, according to the second embodiment, since the data transmitter 39b of the server 30 transmits the calculated gamma values to the client 40, the gamma values created by the server 30 can be used by another apparatus.

According to the second embodiment, the data receiver 50a of the client 40 receives the transmitted gamma values, and corrects the frames of a moving-image by applying the received gamma values to the frames of the moving-image. Therefore, when the gamma values calculated by the server 30 are utilized so that the frames are corrected, it is not necessary that the client 40 calculates the gamma values, and thus a load on the client 40 can be reduced.

The moving-image correction-coefficient calculating apparatus, the server, and the client explained in the first and the second embodiments can be realized by executing-prepared programs by a computer system such as a personal computer or a work station.

Figure 10:
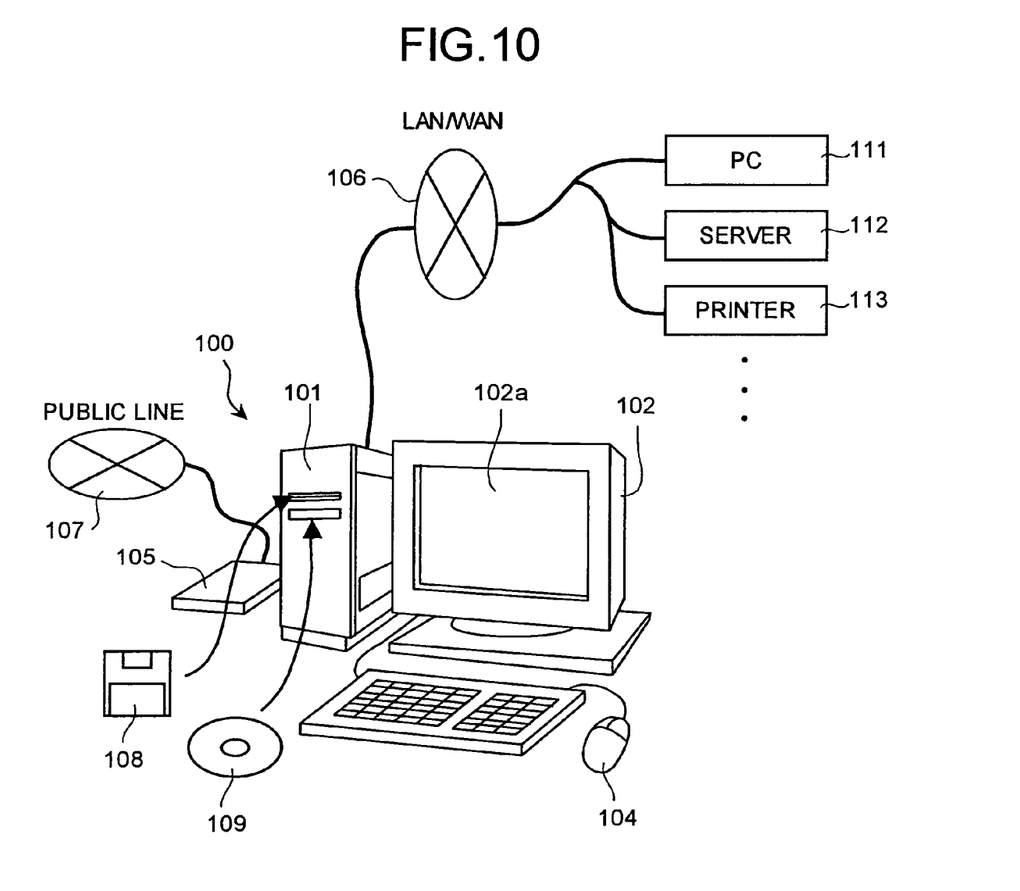
FIG. 10 is a configurational diagram of a computer system according to a third embodiment of the present invention.
Figure 11:
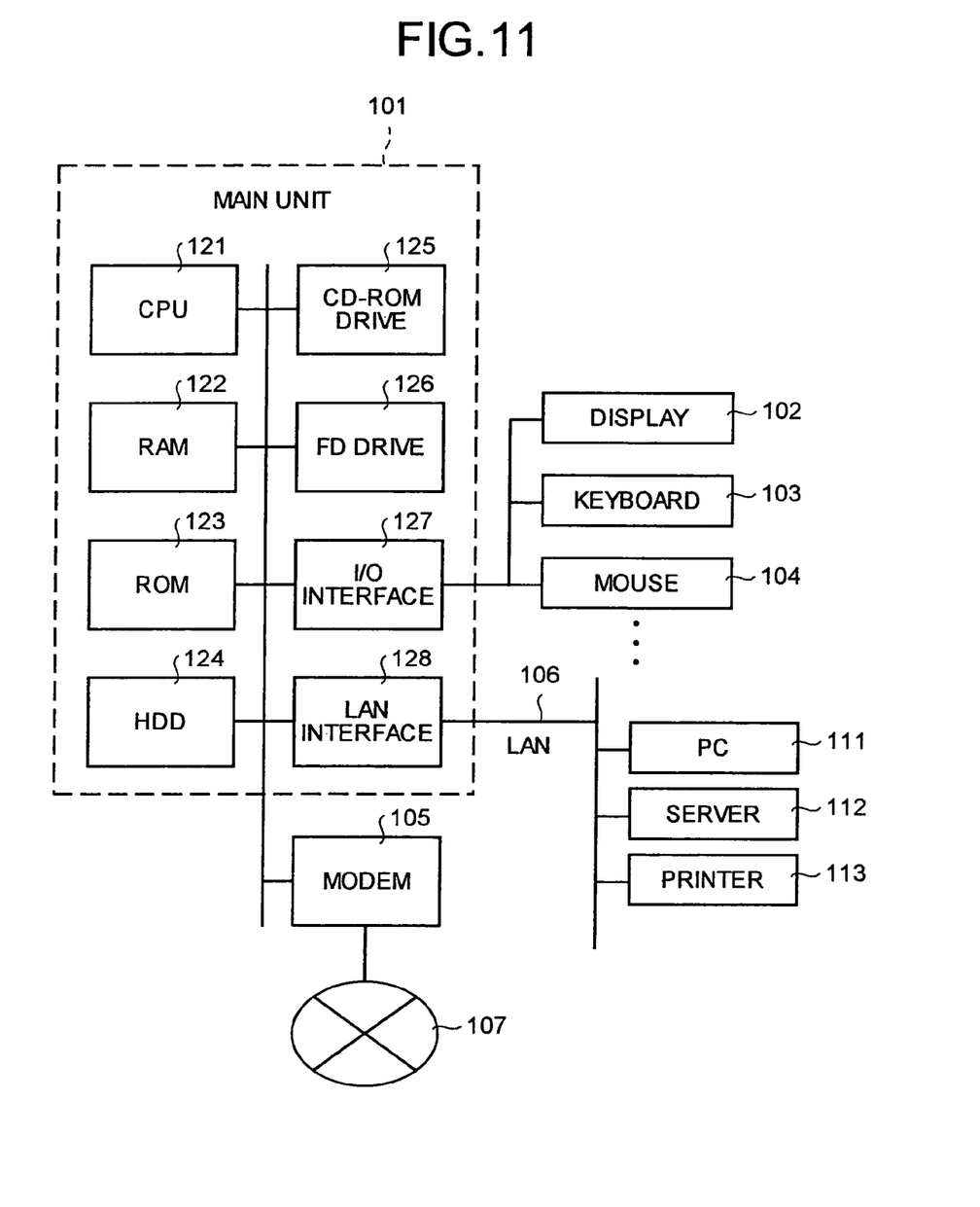
FIG. 11 is a block diagram of a configuration of a main unit in the computer system shown in FIG. 10.

FIG. 10 is a configurational diagram of the computer system according to a third embodiment of the present invention, and FIG. 11 is a block diagram of a configuration of a main unit in the computer system shown in FIG. 10.

As shown in FIG. 10, a computer system 100 has a main unit 101, a display 102 that displays information such as images on a display screen 102a according to an instruction from the main unit 101, a keyboard 103 that inputs various information into the computer system 100, and a mouse 104 that specifies an arbitrary position on the display screen 102a of the display 102.

The main unit 101 in the computer system 100 has, as shown in FIG. 11, a central processing unit (CPU) 121, a random access memory (RAM) 122, a read only memory (ROM) 123, a hard disk drive (HDD) 124, a compact disc-read only memory (CD-ROM) drive 125 into which a CD-ROM 109 is inserted, a flexible disk (FD) drive 126 into which an FD 108 is inserted, an input/output (I/O) interface 127 that connects the display 102, the keyboard 103, and the mouse 104, and a local area network (LAN) interface 128 that is connected to a local area network or a wide area network (LAN/WAN) 106.

The computer system 100 is connected to a modem 105 that connects the system to a public line 107 such as the Internet, and is connected to another computer system (i.e., a personal computer (PC)) 111, a server 112, a printer 113, and the like via the LAN interface 128 and the LAN/WAN 106.

The computer system 100 reads and executes the programs recorded in a predetermined recording medium so as to realize the similar functions to those of the moving-image correction-coefficient calculating apparatus, the server, and the client.

The predetermined recording medium includes various recording media that record programs readable by the computer system 100 therein. The recording media include "portable physical media" such as the FD 108, the CD-ROM 109, a magneto-optical (MO) disc, a digital versatile disc (DVD), an integrated-circuit (IC) card, and "fixed physical media" such as the HDD 124, the RAM 122, and ROM 123 that are mounted on the inside/outside of the computer system 100. The recording media further include "communication media" such as the public line 107 that is connected via the modem 105 and the LAN/WAN 106 that is connected with another computer system 111 and the server 112, for holding programs for a short period at the time of transmission of the programs.

That is, the programs are recorded in the recording media such as the "portable physical media", the "fixed physical media", and the "communication media" so as to be readable by the computer. The computer system 100 reads the programs from the recording media and executes them so as to realize the similar functions to those of the moving-image correction-coefficient calculating apparatus, the server, and the client.

The programs are not limited to the execution by the computer system 100, and the present invention can be applied even when another computer system 111 or server 112 executes the programs or when the system and the server cooperate with each other so as to execute the programs.

Exemplary embodiments of the present invention are described above, however, variously modified embodiments other than the one described can be made within the scope of the technical spirit of the appended claims.

Of the respective processing explained in the embodiments, all or a part of the processing explained as being performed automatically may be performed manually, or all or a part of the processing explained as being performed manually may be performed automatically in a known method.

The information including the processing procedure, the control procedure, specific names, and various kinds of data and parameters shown in the description or in the drawing can be optionally changed, unless otherwise specified.

The respective constituents of the illustrated apparatus are functionally conceptual, and the physically same configuration is not always necessary. In other words, the specific mode of dispersion and integration of the apparatus is not limited to the illustrated one, and all or a part thereof may be functionally or physically dispersed or integrated in an optional unit, according to the various kinds of load and the status of use.

All or an optional part of the various processing functions performed by the apparatus can be realized by the CPU or a program analyzed and executed by the CPU, or can be realized as hardware by the wired logic.

According to the present invention, image quality can be improved and calculation amount for calculating correction-coefficients can be reduced in a balanced manner.

Furthermore, according to the present invention, the calculation amount for calculating the correction-coefficients can be further reduced.

Moreover, according to the present invention, the correction-coefficients can be calculated at a suitable interval according to a fluctuation in temporary correction-coefficients.

Furthermore, according to the present invention, the temporary correction-coefficients for the frames timewise closer to the frames to which the correction-coefficients are applied are emphasized, so that the image quality can be improved.

Moreover, according to the present invention, when a scene change with a large image change amount or the like occurs, timing at which the correction-coefficients are calculated is changed, so that the image quality can be improved.

Furthermore, according to the present invention, the image change amount of the frames can be determined efficiently.

Moreover, according to the present invention, the timing at which the temporary correction-coefficients are calculated is changed, so that the correction-coefficients are calculated more suitably, and the image quality can be improved.

Furthermore, according to the present invention, the correction-coefficients are calculated more suitably, and the image quality can be improved.

Moreover, according to the present invention, the setting specified by a user can be reflected on the calculation of the temporary correction-coefficients or the correction-coefficients.

Furthermore, according to the present invention, the correction-coefficients created by the apparatus itself can be used by another apparatus.

Moreover, according to the present invention, the correction-coefficients calculated by another apparatus are utilized to correct the frames, and as a result, it is not necessary for the apparatus itself to calculate the correction-coefficients, and thus a load on the apparatus can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for calculating a moving-image correction-coefficient to be applied to frames of a moving-image, the apparatus comprising:
    a temporary calculating unit that calculates a temporary correction-coefficient to be applied to a frame extracted from the frames of the moving-image based on a first standard of extracting non-consecutive frames at a constant time interval;
    a temporary storage unit that stores the temporary correction-coefficient calculated by the temporary calculating unit; and
    a correction-coefficient calculating unit that calculates the moving-image correction-coefficient to be applied to a frame extracted from the frames of the moving-image based on a second standard of extracting non-consecutive frames at a constant time interval, based on the temporary correction-coefficient stored in the temporary storage unit, wherein the frequency of extracting frames by the second standard is higher than the frequency of extracting frames by the first standard.

2. The apparatus according to claim 1, wherein the correction-coefficient calculating unit changes the second standard based on an amount of change of the temporary correction-coefficient calculated.

3. The apparatus according to claim 1, wherein the correction-coefficient calculating unit calculates the moving-image correction-coefficient by performing a weighted averaging on the temporary correction-coefficient calculated.

4. The apparatus according to claim 3, wherein the correction-coefficient calculating unit applies a larger weighting coefficient to the temporary correction-coefficient corresponding to a frame with a smaller time difference from a frame to which the moving-image correction-coefficient is applied when performing the weighted averaging.

5. The apparatus according to claim 1, wherein the correction-coefficient calculating unit calculates the moving-image correction-coefficient by performing an interpolating operation on the temporary correction-coefficient calculated.

6. The apparatus according to claim 5, wherein the correction-coefficient calculating unit applies a larger weighting coefficient to the temporary correction-coefficient corresponding to a frame with a smaller time difference from a frame to which the moving-image correction-coefficient is applied when performing the interpolating operation.

7. The apparatus according to claim 1, further comprising:
a change-amount determining unit that determines an amount of image change of the frame, wherein
when the change-amount determining unit determines that the amount of the image change is large, the temporary calculating unit changes the second standard.

8. The apparatus according to claim 7, wherein the change-amount determining unit determines the amount of the image change based on a change in the temporary correction-coefficient.

9. The apparatus according to claim 7, wherein when the change-amount determining unit determines that the amount of the image change is large, the correction-coefficient calculating unit changes the first standard.

10. The apparatus according to claim 7, wherein when the change-amount determining unit determines that the amount of the image change is large, the correction-coefficient calculating unit sets a weighting coefficient to be applied to the temporary correction-coefficient based on the amount of the image change when calculating the moving-image correction-coefficient.

11. The apparatus according to claim 1, further comprising:
an input accepting unit that accepts an input relating to first setting for a calculation of the temporary correction-coefficient and a second setting for a calculation of the moving-image correction-coefficient, wherein
the temporary calculating unit or the correction-coefficient calculating unit calculates the temporary correction-coefficient or the moving-image correction-coefficient based on the first and the second settings accepted by the input accepting unit.

12. The apparatus according to claim 1, further comprising a correction-coefficient transmitting unit that transmits the moving-image correction-coefficient calculated.

13. The apparatus according to claim 1, wherein the moving-image correction-coefficient to be applied to frames of a moving-image includes correction-coefficient of gamma correction, correction-coefficient of color balance correction or correction-coefficient of chroma saturation correction.

14. The apparatus according to claim 1, wherein the correction-coefficient calculating unit compares temporary gamma values between adjacent temporary correction-coefficient frames and when an absolute value of a difference in the temporary gamma values is equal to or more than a threshold value, a time interval of the correction-coefficient calculating unit for calculating the gamma values is set to be more narrow.

15. A method of calculating a moving-image correction-coefficient to be applied to frames of a moving-image, the method comprising:
calculating a temporary correction-coefficient to be applied to a frame extracted from the frames of the moving-image based on a first standard of extracting non-consecutive frames at a constant time interval;
storing the temporary correction-coefficient calculated; and
calculating, using a processor, the moving-image correction-coefficient to be applied to a frame extracted from the frames of the moving-image based on a second standard of extracting non-consecutive frames at a constant time interval, based on the temporary correction-coefficient stored,
wherein the frequency of extracting frames by the second standard is higher than the frequency of extracting frames by the first standard.

16. A non-transitory computer-readable recording medium that stores a computer program for calculating a moving-image correction-coefficient to be applied to frames of a moving-image, the computer program making a computer execute:
calculating a temporary correction-coefficient to be applied to a frame extracted from the frames of the moving-image based on a first standard of extracting non-consecutive frames at a constant time interval;
storing the temporary correction-coefficient calculated; and
calculating the moving-image correction-coefficient to be applied to a frame extracted from the frames of the moving-image based on a second standard of extracting non-consecutive frames at a constant time interval, based on the temporary correction-coefficient stored,
wherein the frequency of extracting frames by the second standard is higher than the frequency of extracting frames by the first standard.

* * * * *